United States Patent [19]
Lalis et al.

[11] 3,981,696
[45] Sept. 21, 1976

[54] MULTIPASSAGE DIFFUSER

[75] Inventors: André Lalis, Le Plessis Robinson; René Rouvière, Orange; Gilbert Simon, Sèvres, all of France

[73] Assignee: Commissariat a l'Energie Atomique, Paris, France

[22] Filed: May 7, 1974

[21] Appl. No.: 467,743

[30] Foreign Application Priority Data
May 18, 1973 France .............................. 73.18166

[52] U.S. Cl. .................................. 55/158
[51] Int. Cl.² ......................................... B01D 53/22
[58] Field of Search ........................ 55/158; 210/321

[56] References Cited
UNITED STATES PATENTS

| | | | |
|---|---|---|---|
| 2,334,592 | 2/1956 | Jones | 55/158 |
| 3,135,591 | 6/1964 | Jones | 55/158 X |
| 3,837,146 | 9/1974 | Fauar | 55/158 |

FOREIGN PATENTS OR APPLICATIONS

| | | | |
|---|---|---|---|
| 960,712 | 6/1964 | United Kingdom | 55/158 |

*Primary Examiner*—John Adee
*Attorney, Agent, or Firm*—Cameron, Kerkam, Sutton, Stowell & Stowell

[57] ABSTRACT

A multipassage diffuser having 2p passages comprises a leak-tight cylindrical enclosure closed by a top cover and a bottom end-wall, parallel porous tubes which are rigidly assembled in sectors between tube plates and through which the gas mixture flows, the tube sectors being disposed at uniform intervals on the periphery of the enclosure. The top tube plates are rigidly fixed to an annular header having the shape of a half-torus and adapted to communicate with the tubes of the corresponding sector.

Each passage is constituted by a plurality of juxtaposed sectors in which the mixture circulates in the same direction, the header being divided into p portions limited by radial partition-walls and each constituting two adjacent passages.

The diffuser is provided beneath the bottom end-wall with p-1 leak-tight chambers each adapted to open into two different portions of the header, and with two collector-chambers each fitted with a nozzle for introducing the gas mixture and discharging the fraction of the undiffused mixture. By means of a central orifice formed in the bottom end-wall the enclosure communicates with a shaft for discharging the diffused fraction of the gas mixture.

7 Claims, 4 Drawing Figures

MULTIPASSAGE DIFFUSER

This invention relates to a multipassage diffuser.

In an installation for isotopic separation by gaseous diffusion, the separation stages comprise one or a number of diffusers within which the stream of isotopic mixture (for example uranium hexafluoride containing uranium-238 and uranium-235) is enriched in the light isotope of uranium as it passes through porous walls or so-called barriers. When these latter are tubular, said diffuser is designed in the form of a bundle of porous tubes enclosed within a cylindrical shell. The high-pressure stream (isotopic mixture to be enriched) passes into the tubes at one end of the bundle; a fraction of said stream does not undergo diffusion and is collected at the other end of the bundle at a slightly lower level of pressure (medium pressure stream). That part which diffuses through the porous barriers and which is enriched in light isotope is sucked at low pressure by means of a compressor into the interior of a space formed between the tubes of the bundle.

In diffusers of known types, there is only a single passage of the isotopic mixture. In other words, a bundle of parallel tubes is mounted within the cylindrical shell and constitutes the diffusion barriers. The isotopic mixture is fed into one end of the bundle, the undiffused portion of the mixture is collected at the other end and the fraction which is enriched in the light isotope is collected within the interior of the cylindrical shell. The number and length of the tubes which are placed in parallel so as to constitute said bundle are usually the result of economic optimization. For example, the achievement of good separation performances entails the need for a high flow rate (and therefore a small number of tubes in parallel) without giving rise to prohibitive pressure drops. Moreover, the dimensions of the diffuser are not without influence on its cost price or on the possibilities of positional arrangement and installation inside buildings. The result which may thus be achieved is a diffuser of substantial overall length. This is clearly attended by a disadvantage in that the location of a diffuser of this type within buildings becomes a matter of difficulty. Furthermore, the rate of internal flow which decreases from the high-pressure inlet to the medium-pressure outlet progressively as the diffusion process takes place cannot be maintained at each point at the most favorable level for the separation and the pressure drops. High bending moments and expansion stresses are also developed. Furthermore, the pipes which provide connections between the medium pressure outlet and the compressor are of considerable length.

The precise aim of the present invention is to provide a multipassage diffuser which overcomes the disadvantages mentioned in the foregoing.

By a multipassage diffuser having $n$ passages is meant a diffuser in which the gas mixture is not discharged to the exterior after having passed through a tube but is fed back into another tube and then into a following tube and so forth until it passes through the $n^{th}$ tube, whereupon the mixture is passed out towards another diffuser.

The multipassage diffuser having $2p$ passages is characterized in that said tubes are grouped together in sectors each having a plurality of tubes, each tube of any one sector being inserted at one end in a perforated plate, the tubes of any one sector being coupled in rigidly fixed relation by means of clamping members uniformly spaced in height, said sectors being disposed at uniform intervals on the periphery of said enclosure, the top perforated tube plates being rigidly fixed to an annular header having the shape of a half-torus limited by the mid-plane thereof, said header being provided with an orifice opposite to each tube plate for providing a communication between said header and the tubes of the corresponding sector, the bottom tube plates being rigidly fixed to the bottom end-wall of said enclosure, said bottom end-wall being provided with orifices opposite to each bottom tube plate, each passage being constituted by a plurality of juxtaposed sectors in which the mixture circulates in the same direction, said header being divided into $p$ portions limited by radial partition-walls, each portion containing the orifices corresponding to the sectors being intended to constitute two adjacent passages, said diffuser being also provided beneath the bottom end-wall thereof with $p-1$ leak-tight chambers having top walls constituted by said bottom end-wall, each chamber provided with orifices corresponding to the sectors associated with two adjacent passages being such as to open at the top portion thereof into two different portions of the header, and two collector-chambers having top walls which are also constituted by the bottom end-wall of said enclosure, a communication being established between each collector-chamber and the sectors of one of the two remaining passages, each collector-chamber being fitted with a nozzle respectively for introducing the gas mixture and discharging the fraction of the undiffused mixture, said bottom end-wall being further provided with a central orifice for putting the interior of said enclosure into communication with a shaft for discharging that fraction of the gas mixture which has diffused.

In other words, each passage comprises a certain number of sectors ($n_1$ in the case of the first passage, $n_2$ in the case of the second passage, ... $n_{2p}$ in the case of the passage of order $2p$) and each sector comprises a certain number of tubes ($m_{1,1}$ in the case of the first sector of the first passage, $m_{1,2}$ in the case of the second sector of the first passage ... $m_{j,1}$ in the case of the sector of order $j$ of the passage of order $i$). All the tubes of any one passage are mounted in parallel between a portion of header and a leak-tight chamber or a collector-chamber and the passages are mounted in series by means of portions of header and leak-tight chambers.

A more complete understanding of the invention will in any case be gained from the following description of a number of embodiments of the invention which are given by way of example without any limitation being implied, reference being made to the accompanying drawings, wherein.

Figure 1:
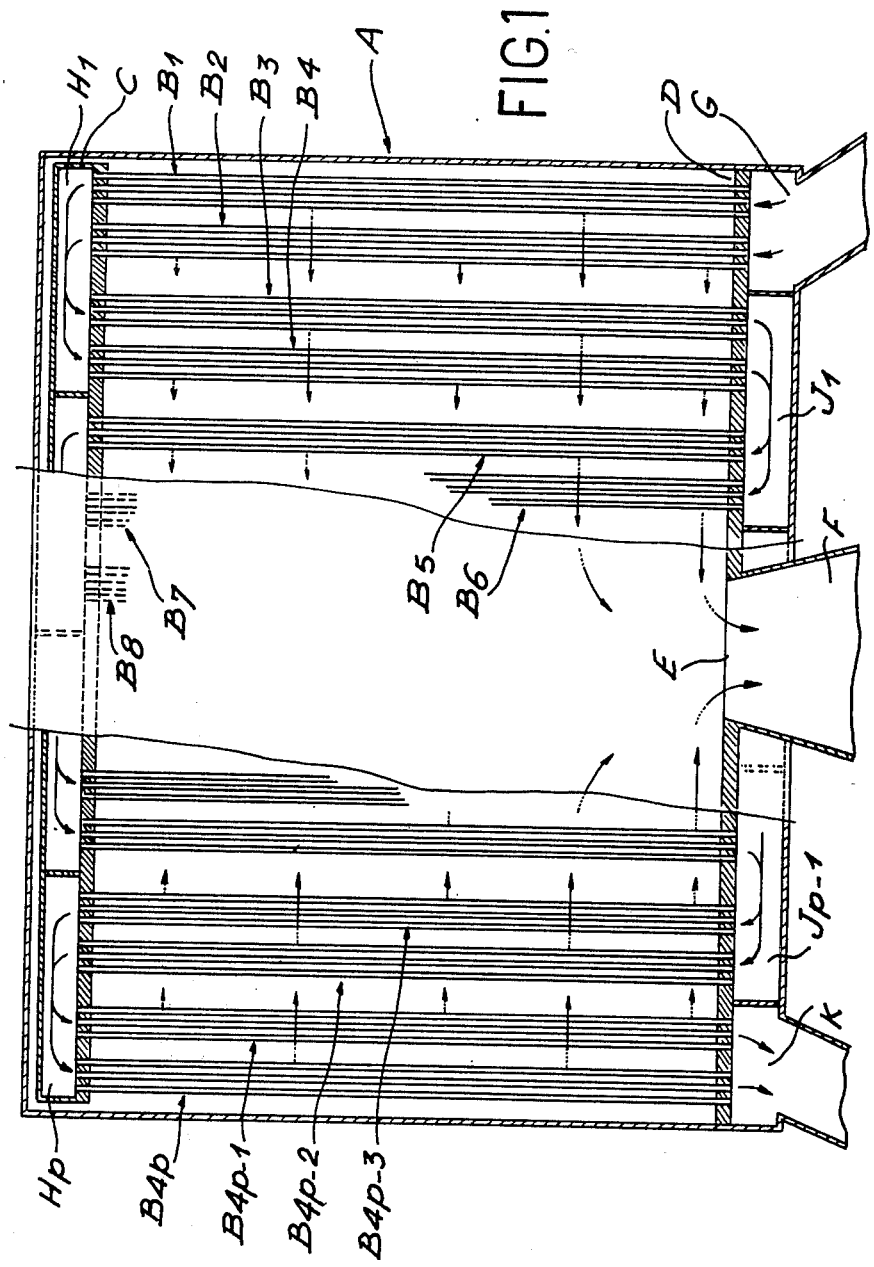
FIG. 1 is a diagrammatic view of a multipassage diffuser.

There is shown in FIG. 1 a diagrammatic developed view of a multipassage diffuser having $2p$ passages. A represents the developed cylindrical enclosure of the diffuser. $B_1, B_2 \ldots B_{4p}$ represent the sectors which are each constituted by $m$ parallel porous tubes. Each passage has two sectors ($n_1 = n_2 \ldots n_{2p} = 2$). These sectors are disposed at uniform intervals on the periphery of the cylindrical enclosure A. Each sector comprises a top tube plate and a bottom tube plate which are not shown in FIG. 1. The top tube plates are rigidly fixed to the manifold or header C and this latter has the shape of a half-torus which is limited by its central plane. Each tube of the sectors opens into the header C by means of tube plates. The bottom tube plates are rigidly fixed to the bottom end-wall D of the cylindrical enclosure in which are formed peripheral orifices (not shown) corresponding to each tube plate and a central orifice E which puts the interior of the enclosure A into communication with a shaft F for the discharge of the diffused mixture. The lower ends of the sectors $B_1$ and $B_2$ open into an inlet collector-chamber G for the supply of the gas mixture and the upper ends of said sectors communicate with the portion $H_1$ of the header C. The sectors $B_3$ and $B_4$ communicate on the one hand with the portion $H_1$ and on the other hand with the leak-tight chamber $J_1$; the sectors $B_7$ and $B_8$ communicate with the portion $H_2$ and with the chamber $J_2$ and so forth up to the sectors $B_{4p-3}$ and $B_{4p-2}$ which communicate with the portion $H_p$ and with the chamber $J_{p-1}$. Finally, the sectors $B_{4p-1}$ and $B_{4p}$ communicate with the portion $H_p$ and with the outlet collector-chamber K for the discharge of the undiffused gas mixture. Between the inlet collector-chamber G and the outlet collector-chamber K, the gas mixture has thus carried out $2p$ passages within the diffuser, $p$ passages being in the direction of upward flow and $p$ passages being in the direction of downward flow. Each passage takes place within two sectors having $m$ tubes.

As has been mentioned earlier, each passage can comprise a different number of sectors and each sector can comprise a different number of tubes. By making a suitable choice of these two numbers, the desired useful cross-sectional area may be obtained in the case of each passage.

In fact, the useful cross-sectional area of the passage of order $i$ is given by the formula:

$$S_i = s \cdot \sum_{j=1}^{j=n_i} m_{j,i}$$

where $s$ represents the cross-sectional area of a tube and $m_{j,i}$ represents the number of tubes of the sector of order $j$ of the passage of order $i$.

This is of considerable interest by reason of the fact that part of the gas stream has diffused across the gaseous wall between the two ends of the tubes of one and the same passage. There is therefore a lower rate of flow at the outlet of a tube than at the inlet. By progressively reducing the useful cross-sectional areas $S_i$ from one passage to the next, it is possible to maintain optimum operating conditions throughout the diffuser.

In the following description, consideration is given to the particular case of a double-passage diffuser for the sake of enhanced simplicity of the detail drawings. Accordingly, we have $p = 1$ and $n = 3$.

The diffuser essentially comprises a sub-diffuser unit 2, an enclosure 4 which is fixed on said unit 2 and sectors of the tube bundle such as the sectors 6a, 6b and so forth which are disposed within said enclosure 4.

The sub-diffuser unit 2 has the design function of supporting the complete diffuser assembly and serves at the same time as gas-flow distribution box. The sub-diffuser unit comprises a first shell 8 of frusto-conical shape which delimits in the central portion thereof a chimney or shaft 10 for establishing a connection between said unit and the interior of the enclosure 4. The unit 2 additionally comprises two peripheral chambers 12 and 14 (or collector-chambers) which are limited internally by the shell 8 and by a second inclined shell 16; said chambers are limited externally by a cylindrical shell 18 and by inclined walls such as those designated by the reference numerals 20 and 22. The chambers 12 and 14 are each joined to a nozzle designated respectively by the reference numerals 24 and 26 and welded to the outer shell 18. The sub-diffuser unit 2 is limited at the top portion thereof by a plate 28 pierced by a central orifice 30 which provides a communication between the shaft 10 and the interior of the enclosure 4 and by peripheral orifices such as those designated by the references $32a \ldots 32d$ which serve as means of communication between the chambers 12 and 14 and the sectors $6a \ldots 6d$.

The enclosure 4 has a main cylindrical portion 34 which terminates in a top domical cover 36 and in a bottom coupling-flange. The enclosure 4 is rigidly fixed to the sub-diffuser unit 2 by means of bolts such as the bolt 40 which are engaged in the flange 38 and in the top plate 28 with interposition of a seal between these two elements, said seal having been omitted from the figures.

Figure 2:
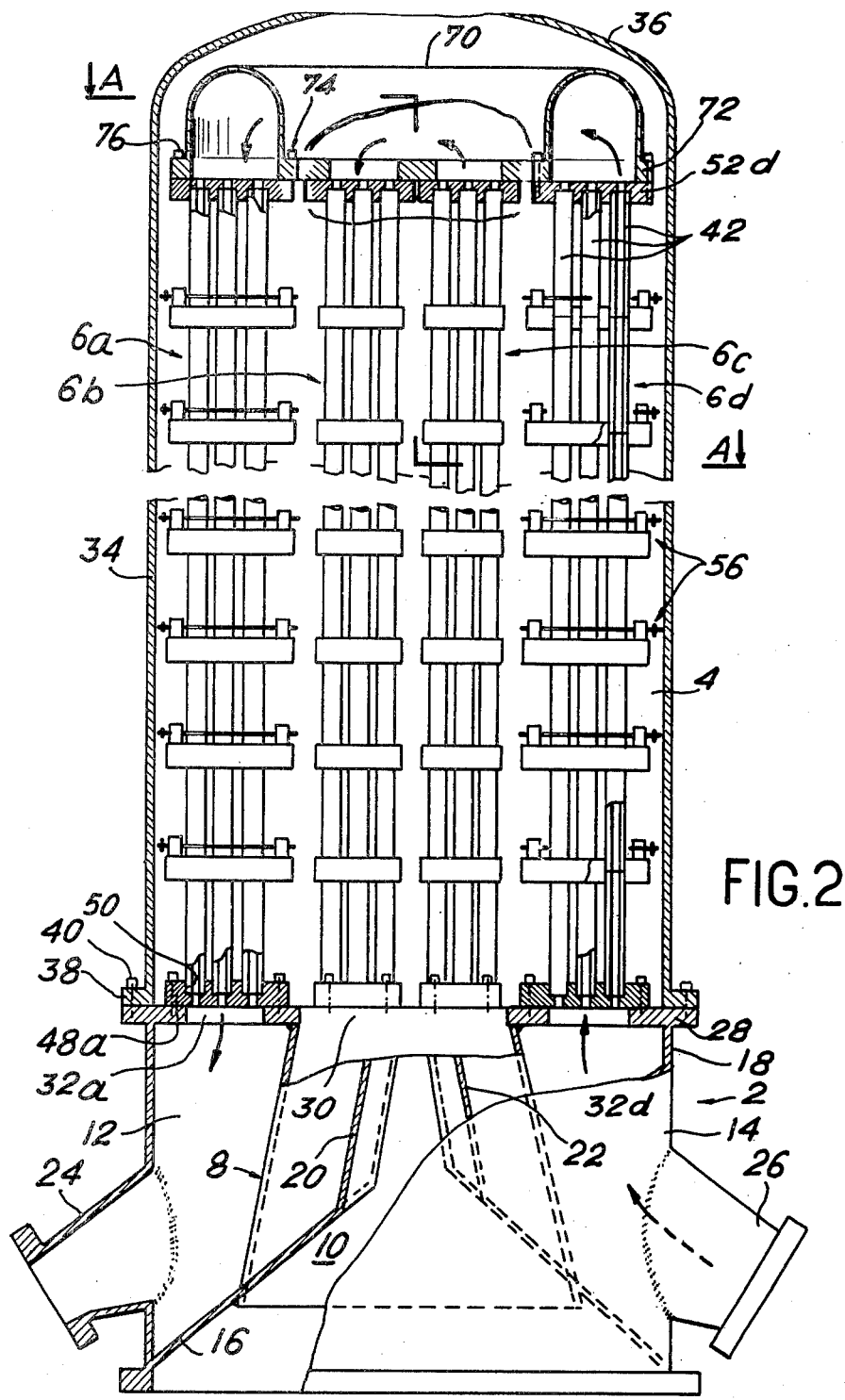
FIG. 2 is a vertical sectional view of a diffuser having two passages.
Figure 3:
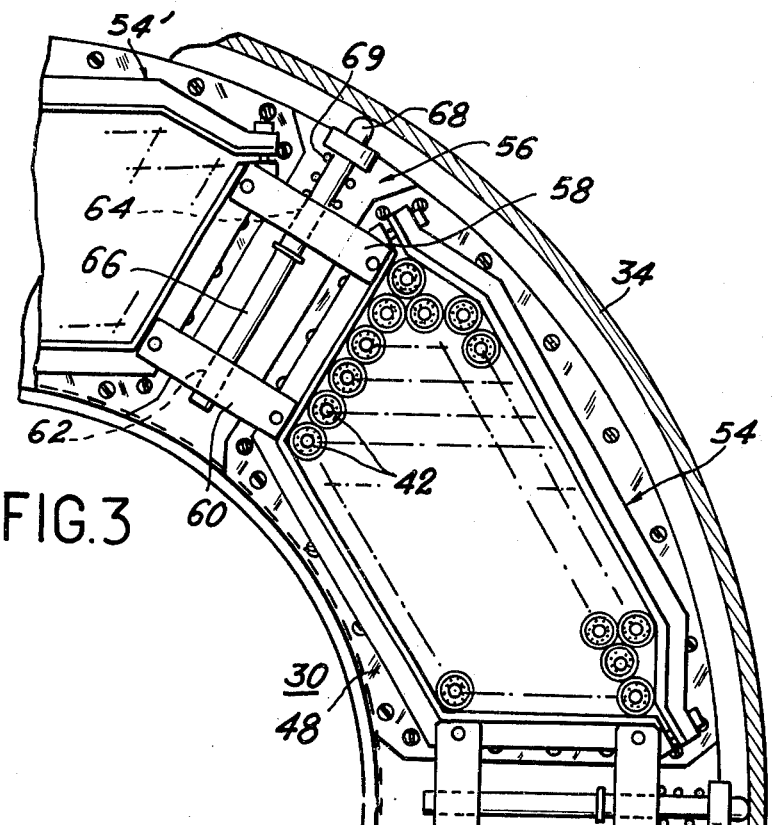
FIG. 3 is a horizontal sectional view of the same diffuser, this view being taken along the plane A—A of FIG. 2.
Figure 4:
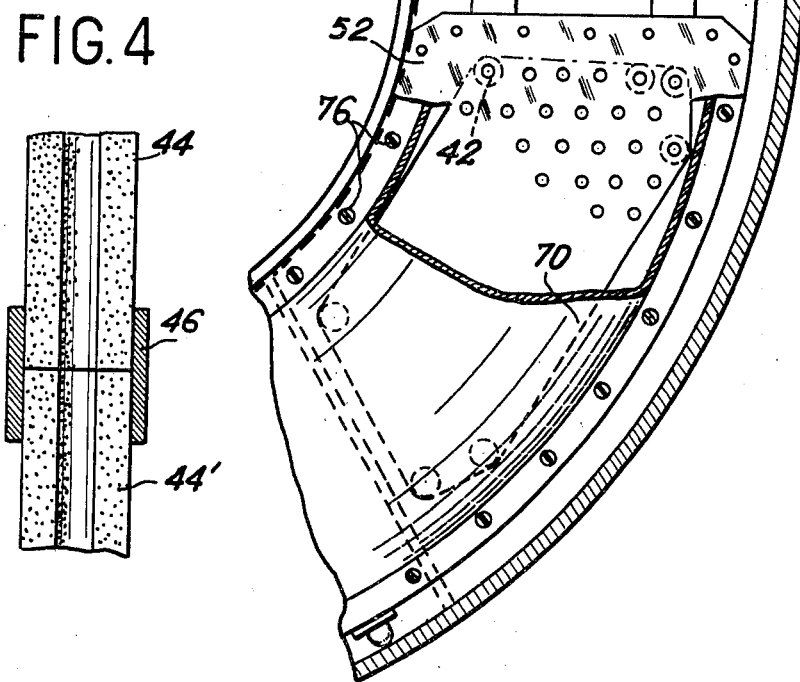
FIG. 4 is a detail view showing the connection of two diffusion barriers.

The tube bundle is constituted by a plurality of sectors 6a, 6b and so forth (four of which are shown in FIG. 1 and three of which are shown in FIG. 2), provision being made in this embodiment for a total of six sectors. Each sector comprises a plurality of columns of the type designated by the reference numeral 42. Each column is constituted by a plurality of porous tubes such as the tubes 44 and 44' which are joined together in end-to-end relation as shown in FIG. 3. Two consecutive porous tubes 44, 44' are joined together by means of a clamping sleeve 46 which extends beyond the extremities of the tubes 44. A leak-tight and continuous tube of porous material is thus obtained.

Each column 42 of a given sector is fastened at the lower end to a tube plate such as the sector which is designated by the reference 48a in the case of the sector 6a and which is pierced by orifices such as those bearing the reference 50. These orifices of the tube plate 48a open into the orifice 32 of the corresponding plate 28. The tubes 42 are inserted in the tube plate or welded. Similarly, the columns 42 are rigidly fixed at the upper ends thereof to a second top tube plate 52a in the case of the sector 6a. The connection between the columns and the tube plates is clearly leak-tight.

At the level of each coupling sleeve 46, the columns of a given sector are held together by means of clamping flanges such as the flange 54 shown in FIG. 3. The columns of a given sector are thus uniformly distributed within a circular ring sector.

A special system designated by the reference 56 serves to endow the tube bundle with rigidity at the level of each clamping member 54. Said device comprises two coupling members 58 and 60 which are rigidly fixed to the clamping members 54 and 54' of two juxtaposed sectors. Each coupling member 58 and 60 has an orifice 62 and 64, the common axis of which is disposed on a radius of the cylinder 34. A rod 66 is capable of displacement within the orifices 62 and 64 and the head 68 of said rod is applied against the wall 34 of the enclosure 4 by means of a spring 69. The devices 56 are mounted between the consecutive sectors and placed at different levels of connection of the tubes 44 which constitute the columns 42.

The heads 68 of the devices 56 are capable of longitudinal sliding motion along the wall 34. In consequence, the systems 56 ensure that the tube bundles are maintained in position in the radial direction while permitting expansion of the columns 42.

The top tube plates 52 are joined to a floating header 70 (or manifold). Said floating header has the shape of a circular half-torus which is limited by its midplane and is provided with a flange 72 and 74 both on its internal periphery and on its external periphery. The floating header 70 is connected to the tube plates 52 by means of screws such as the screw 76. The floating header 70 aforementioned has two functions. It serves on the one hand to recover the undiffused stream which flows out of the first-passage columns towards the inlets of the second-passage columns and serves on the other hand to secure the top tube plates 52 of the tube bundle so as to form a rigid assembly.

The operation of the diffuser is as follows. The isotopic mixture to be treated (high-pressure stream) is introduced into the peripheral chamber 14 through the nozzle 26. The isotopic mixture passes through the first-passage sectors, that is to say through the sectors 6c, 6d in the case of the figure, and through a third sector which is not shown in FIG. 1. Part of the isotopic mixture which is enriched in the light isotope passes through the tubes 42 and again reaches the interior of the enclosure 4. This part of the stream is discharged through the low-pressure shaft 10. The part of the flux which has not diffused is collected by the floating header 70 and directed to the inlets of the second-passage sectors (sectors 6b, 6a and a third sector which is not illustrated). The isotopic mixture passes through the columns 42 of said sectors. The undiffused portion of the stream is collected in the peripheral chamber 12 and is discharged at medium pressure through the nozzle 24. The diffused portion of the stream again reaches the enclosure 4 and is discharged at low pressure through the shaft 10.

It has been assumed in the foregoing description and in the accompanying drawings that the diffuser is in the vertical position. As is readily apparent, it may be found necessary to employ the diffuser in an oblique or horizontal position and it would clearly not constitute any departure from the scope of the invention to make use of the diffuser in such a position.

The advantages of a diffuser as hereinabove described can clearly be seen from the figure. By virtue of the fact that a plurality of passages are available for any given diffusion surface, the diffuser has a smaller height. The floating header permits free expansion of the columns in the lengthwise direction whereas this would not be possible if provision were made for a top tube plate rigidly fixed to the enclosure as in the diffusers of the prior art. Furthermore, the arrangement of the columns in sectors permits much easier positioning and repair of the porous barriers.

In fact, disassembly of the sectors is a very simple operation since the top tube plates are bolted onto the underface of the floating header and since the bottom tube plates are bolted onto the bottom end-wall of the cylindrical enclosure. It is in any case possible to replace the bolts by any other mechanical connection means of a demountable type.

What we claim is:

1. A multi-passage diffuser for isotopic separation of air isotopic mixture comprising a leak-tight cylindrical enclosure cover closing the top of said enclosure, an end-wall closing the bottom of said enclosure, a plurality of parallel rectilinear tubes in said enclosure of porous material through which the isotopic mixture is circulated, parallel to an axis of said enclosure, means for grouping said tubes together in sectors each sector having a plurality of tubes, top and bottom perforated tube plates for each sector receiving the ends of the tubes of the sector, clamping members uniformly spaced along the tubes of each sector rigidly coupling the tubes of each sector, said sectors being disposed at uniform intervals around the interior periphery of said enclosure, a floating annular header in said enclosure, said top perforated tube plates being rigidly fixed to said annular header, said header being a half-torus, an orifice in said header opposite each of said top tube plates establishing communication between said header and said tubes of the corresponding one of said sectors, said bottom tube plates being rigidly fixed to said end-wall of said enclosure, orifices in said end-wall opposite each of said bottom tube plates, passages constituted by a plurality of juxtaposed sectors in which the mixture circulates in the same direction, radial portions in said header dividing said header into portions, each of said portions containing said orifices corresponding to said sectors constituting two adjacent passages, leak-tight chambers beneath said end-wall, top walls for said chamber constituted by said end-wall, orifices for each of said chambers corresponding to said sectors of two adjacent ones of said passages opening into two different portions of said header, two of said chambers being collector-chambers, each of said collector-chambers communicating with said sectors of one of the two remaining passages, a nozzle for each of said collector-chambers for introducing the isotopic mixture and for discharging the fraction of the undiffused mixture, a central orifice for said end-wall opening into the interior of said enclosure and a shaft connected to said central orifice for discharging the diffused fraction of the isotopic mixture.

2. A diffuser according to claim 1, wherein the number of tubes constituting one of said passages progressively decreases from one of said passages to the next of said passages in the direction of circulation of the isotopic mixture.

3. A diffuser according to claim 1, wherein each of said tubes comprises a plurality of tube-sections of porous material in end-to-end relation and sleeves rigidly coupling said sections together, said sleeves having an external diameter larger than the external diameter of said tubes.

4. A diffuser according to claim 1, wherein said tubes of any one of said sectors are spaced at uniform intervals within a circular ring and said sectors have the same shape.

5. A diffuser according to claim 1, wherein said clamping members engage said tubes at the level of each of said coupling sleeves.

6. A diffuser according to claim 1, including a space between two consecutive ones of said sectors, elastic keying means in each of said spaces, each of said devices having a portion rigidly fixed to said clamping members of two consecutive ones of said sectors and a portion moving in a radial direction of said enclosure and elastic means applying said movable portion against said enclosure.

7. A diffuser according to claim 1, including demountable mechanical connection means rigidly securing said top and bottom plates respectively to said floating header and to said end-wall.

* * * * *